(12) United States Patent
Panchaksharaiah et al.

(10) Patent No.: US 12,153,568 B2
(45) Date of Patent: *Nov. 26, 2024

(54) SYSTEMS AND METHODS FOR REPLACING A STORED VERSION OF MEDIA WITH A VERSION BETTER SUITED FOR A USER

(71) Applicant: Adeia Guides Inc., San Jose, CA (US)

(72) Inventors: Vishwas Sharadanagar Panchaksharaiah, Bangalore (IN); Ashwini Dharwa, Ratlam (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,643

(22) Filed: Sep. 27, 2021

(65) Prior Publication Data

US 2022/0365924 A1 Nov. 17, 2022

Related U.S. Application Data

(63) Continuation of application No. 16/627,709, filed as application No. PCT/US2017/039754 on Jun. 28, 2017, now Pat. No. 11,157,485.

(51) Int. Cl.
*G06F 3/0482* (2013.01)
*G06F 3/04847* (2022.01)
(Continued)

(52) U.S. Cl.
CPC ........ *G06F 16/2379* (2019.01); *G06F 3/0482* (2013.01); *G06F 3/04847* (2013.01); *G06F 16/252* (2019.01)

(58) Field of Classification Search
CPC .. G06F 16/2379; G06F 16/252; G06F 3/0482; G06F 3/04847
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

CN 103020243 A 4/2013
CN 104317914 A 1/2015
(Continued)

OTHER PUBLICATIONS

Kadlic, R., et al., "Advance PVR Applications in IMS Based IPTV Environment," 2009 16th International Conference on Systems, Signals and Image Processing, USA, IEEE, Jun. 18, 2009.
(Continued)

*Primary Examiner* — Andrew T Chiusano
(74) *Attorney, Agent, or Firm* — Haley Guiliano LLP

(57) ABSTRACT

A first version of a media asset may be stored (e.g., recorded). Availability of a second version of the media asset may be determined. A first set of characteristics of the first version of the media asset and a second set of characteristics of the second version of the media asset may be identified, where the first set of characteristics and the second set of characteristics include corresponding characteristics that are different between the first version of the media asset and the second version of the media asset. A determination may be made that the second set of characteristics is preferred by the user over the first set of characteristics, and in response, the first version of the media asset may be replaced with the second version of the media asset.

16 Claims, 7 Drawing Sheets

(51) Int. Cl.
*G06F 16/23* (2019.01)
*G06F 16/25* (2019.01)

(56) References Cited

U.S. PATENT DOCUMENTS

| | | | |
|---|---|---|---|
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 9,392,324 | B1 | 7/2016 | Maltar et al. |
| 9,712,861 | B1* | 7/2017 | Milne ............... H04N 21/4382 |
| 2001/0005903 | A1* | 6/2001 | Goldschmidt Iki .......................... H04N 21/44224 725/50 |
| 2002/0174430 | A1 | 11/2002 | Ellis et al. |
| 2004/0153469 | A1 | 8/2004 | Keith-Hill |
| 2005/0086692 | A1 | 4/2005 | Dudkiewicz et al. |
| 2005/0251827 | A1 | 11/2005 | Ellis et al. |
| 2007/0101053 | A1 | 5/2007 | Suzuki |
| 2008/0205857 | A1 | 8/2008 | Kikkawa et al. |
| 2010/0153885 | A1 | 6/2010 | Yates |
| 2011/0119287 | A1 | 5/2011 | Chen et al. |
| 2011/0299836 | A1 | 12/2011 | Amsterdam et al. |
| 2013/0226896 | A1 | 8/2013 | Chin et al. |
| 2013/0336636 | A1* | 12/2013 | Knee ..................... H04N 5/782 386/251 |
| 2014/0032501 | A1 | 1/2014 | Dulaney et al. |
| 2014/0109143 | A1 | 4/2014 | Craner |
| 2014/0122328 | A1* | 5/2014 | Grigg .................. G06Q 20/384 705/40 |
| 2015/0003814 | A1 | 1/2015 | Miller |
| 2015/0331463 | A1* | 11/2015 | Obie ...................... G06F 21/44 713/300 |
| 2017/0091289 | A1 | 3/2017 | Ohazulike et al. |
| 2017/0094355 | A1 | 3/2017 | Mccarty et al. |
| 2018/0096018 | A1* | 4/2018 | Cazin ................... G06F 16/273 |
| 2020/0125555 | A1 | 4/2020 | Panchaksharaiah et al. |
| 2020/0334635 | A1 | 10/2020 | Busey |

FOREIGN PATENT DOCUMENTS

| | | |
|---|---|---|
| JP | 2006345548 A | 12/2006 |
| JP | 2008211468 A | 9/2008 |
| JP | 2009171277 A | 7/2009 |
| JP | 2010507351 A | 3/2010 |

OTHER PUBLICATIONS

PCT International Search Report and Written Opinion in Application No. PCT/US2017/039754, dated Aug. 22, 2017 (13 pages).

* cited by examiner

100

| Characteristic Type 1 | Characteristic Type 2 | Characteristic Type 3 | Characteristic Type 4 |
|---|---|---|---|
| Value A | Value B | Value C | Value D |

| Characteristic Type 1 | Characteristic Type 2 | Characteristic Type 3 | Characteristic Type 4 |
|---|---|---|---|
| Value A | Value X | Value Y | Value Z |

| Characteristic Type 1 | Characteristic Type 2 | Characteristic Type 3 | Characteristic Type 4 |
|---|---|---|---|
| Value A | Value X | Value Y | Value F |

702 Store a first version of a media asset

704 Determine that a second version of the media asset is available

706 Extract a first plurality of characteristics associated with the first version of the media asset, and a second plurality of characteristics associated with the second version of the media asset

708 Compare each characteristic in the second plurality of characteristics with a corresponding characteristic in the first plurality of characteristics

710 Generate, based on the comparing, a first set of characteristics, where the first set of characteristics includes one or more characteristics in the first plurality that do not match one or more corresponding characteristics in the second plurality of characteristics

712 Generate, based on the comparing, a second set of characteristics, where the second set of characteristics includes one or more characteristics in the second plurality that do not match one or more corresponding characteristics in the first plurality of characteristics

714 Compare the first set of characteristics with user preferences for versions of media assets and the second set of characteristics with the user preferences for versions of media assets

716 Determine, based on comparing the first set of characteristics with the user preferences and the second set with the user preferences, that the user prefers versions of media assets that match the second set of characteristics

718 In response to determining that the user prefers the versions of media assets that match the second set of characteristics, replace the first version of the media asset with the second version of the media asset

FIG. 7

SYSTEMS AND METHODS FOR REPLACING A STORED VERSION OF MEDIA WITH A VERSION BETTER SUITED FOR A USER

CROSS-REFERENCE TO RELATED APPLICATIONS

This application is a continuation of U.S. patent application Ser. No. 16/627,709, filed Dec. 30, 2019, which is a national stage application under 35 U.S.C. § 371 of International Application PCT/US2017/039754, filed Jun. 28, 2017, which is hereby incorporated by reference herein in its entirety.

BACKGROUND

Many different systems presently exist that enable a user to record a media asset (e.g., a television program). Some of these systems, during the recording selection, enable a user to choose a version to record (e.g., a High Definition version or a Standard Definition Version). However, these systems are limited in that they are not able to predict the user's affinity for one or more specific versions of a media asset.

SUMMARY

Therefore, systems and methods are disclosed herein for replacing a stored version of media based on user preferences. Generally, user preferences for versions of media (e.g., for High Definition versions, uncensored versions, versions with or without advertisements, and other suitable versions) may be stored in a profile associated with a user. When a different version of stored content becomes available, the stored version may be replaced if the different version would be more suitable for the user based on user preferences for specific characteristics associated with each version.

Specifically, a first version of a media asset may be stored (e.g., recorded). Availability of a second version of the media asset may be determined. A first set of characteristics of the first version of the media asset and a second set of characteristics of the second version of the media asset may be identified, where the first set of characteristics and the second set of characteristics include corresponding characteristics that are different between the first version of the media asset and the second version of the media asset. A determination may be made that the second set of characteristics is preferred by the user over the first set of characteristics, and in response, the first version of the media asset may be replaced with the second version of the media asset.

In some aspects, a media guidance application may be used for replacing a stored version of media based on user preferences. The media guidance application may store a first version of a media asset. For example, the media guidance application may record a censored version of a media asset because an censored version may be the only version available at the time of recording.

The media guidance application may determine that a second version of the media asset is available. For example, the media guidance application may receive new program guide data and, based on the program guide data, determine that the media asset (e.g., a particular television program) is going to be broadcast again.

The media guidance application may extract version characteristics for each version of the program (i.e., the originally recorded version and the newly available version). Specifically, the media guidance application may extract a first plurality of characteristics associated with the first version of the media asset, and a second plurality of characteristics associated with the second version of the media asset. For example, the media guidance application may extract, from metadata associated with the first media asset, characteristics that include "standard definition," "censored," and "with advertisements." The media guidance application may extract, from the second version, characteristics that include "high definition," "uncensored," and "with advertisements."

The media guidance application may compare the corresponding characteristics to find the differences between the stored version and the newly available version. Specifically, the media guidance application may compare each characteristic in the second plurality of characteristics with a corresponding characteristic in the first plurality of characteristics. For example, the media guidance application may compare the characteristic of "standard definition" with the characteristic of "high definition," the characteristic of "censored" with the characteristic of "uncensored," and the characteristic "with advertisements" with the characteristic "with advertisements."

The media guidance application may generate sets of characteristics that do not match between the stored version and the newly available. Specifically the media guidance application may generate, based on the comparing, a first set of characteristics, where the first set of characteristics includes one or more characteristics in the first plurality that do not match one or more corresponding characteristics in the second plurality of characteristics. For example, the first set of characteristics may include characteristics of "standard definition" and "censored." It should be noted that because both versions of the media asset include the characteristic "with advertisements," that characteristic will not be included in the first set. The media guidance application may generate, based on the comparing, a second set of characteristics, where the second set of characteristics includes one or more characteristics in the second plurality that do not match one or more corresponding characteristics in the first plurality of characteristics. For example, the first set of characteristics may include characteristics of "high definition" and "uncensored."

The media guidance application may compare both sets of characteristics with characteristics preferred by the user. Specifically, the media guidance application may compare the first set of characteristics with user preferences for versions of media assets and the second set of characteristics with the user preferences for versions of media assets. For example, the media guidance application may compare characteristics of "standard definition" and "censored" with the characteristics preferred by the user and characteristics of "high definition" and "uncensored" with characteristics preferred by the user.

The media guidance application may determine which set of characteristics is preferred by the user. Specifically, the media guidance application may determine, based on comparing the first set of characteristics with the user preferences and the second set with the user preferences, that the user prefers versions of media assets that match the second set of characteristics. For example, the media guidance application may determine that the user prefers the set of characteristics that includes the characteristic of "high definition" and the characteristic of "uncensored."

The media guidance application may, in response to determining that the user prefers characteristics associated with the second version, replace the first version with the second version. Specifically, the media guidance application may, in response to determining that the user prefers the versions of media assets that match the second set of characteristics, replace the first version of the media asset with the second version of the media asset. For example, the media guidance application may record the second version and delete the first version of the media asset.

In some embodiments, the media guidance application may, when extracting the first plurality of characteristics associated with the first version of the media asset, and the second plurality of characteristics associated with the second version of the media asset, perform the following actions. The media guidance application may generate a first data structure for the first version of the media asset and a second data structure for the second version of the media asset, where the first data structure includes a first plurality of fields and the second data structure includes a second plurality of fields. The media guidance application may iterate through metadata associated with the first version of the media asset to insert the first plurality of characteristics associated with the first version of the media asset into corresponding fields of the first plurality of fields. The media guidance application may iterate through metadata associated with the second version of the media asset to insert the second plurality of characteristics associated with the second version of the media asset into corresponding fields of the second plurality of fields.

For example, the media guidance application may access the metadata associated with the stored version of the media asset and also the metadata associated with the newly available version of the media asset. The media guidance application may generate a data structure for the stored version of the media asset that includes a field for each type of characteristic. For example, one field may be used to store information on whether the version is censored or uncensored. Another field may be used to store information on whether the version is with advertisements or without. Other suitable fields may also be included in the data structure. The media guidance application may create a similar or identical data structure for the newly available version of the media asset. The media guidance application may iterate through the metadata of the stored version of the media asset and the newly available media asset, extract the characteristics, and store the characteristics in the respective fields of the respective data structures.

In some embodiments, the media guidance application may, when comparing each characteristic in the second plurality of characteristics with the corresponding characteristic in the first plurality of characteristics, perform the following actions. The media guidance application may select a first field in the first plurality of fields, and determine an information type associated with the first field. The media guidance application may compare the information type associated with the first field with an information type of each field in the second data structure, and identify, based on comparing the information type associated with the first field with the information type of each field in the second data structure, a second field in the second data structure, where the second field is of the information type associated with the first field. The media guidance application may compare data in the first field with the data in the second field.

For example, the media guidance application may select the field that stores the information on whether the version is censored or uncensored. The media guidance application may determine that the type of the field is censorship information. The media guidance application may use that type to search through the second data structure for the censorship information field and compare the value within the field to determine whether there is a match (e.g., whether both versions are censored or uncensored, or whether one version is censored and the other one is uncensored).

The media guidance application may, when generating the first set of characteristics perform the following actions. The media guidance application may determine, for each field in the first plurality of fields a corresponding field in the second plurality of fields, and compare, for each field in the first plurality of fields, a field's data with a field's data associated with the corresponding field in the second plurality of fields. The media guidance application may determine, based on comparing, for each field in the first plurality of fields, the field's data with the field's data of the corresponding field in the second plurality of fields, whether each field's data in the first plurality of fields matches the corresponding field's data in the second plurality of fields. The media guidance application may store a field identifier for each field in the first plurality of fields where the field's data does not match the field's data of the corresponding field in the second plurality of fields.

For example, the media guidance application may iterate through each field in the first plurality of fields and extract a type of each field. The media guidance application may search the second plurality of fields for the same field type. Upon finding the same field type, the media guidance application may link the two fields. For example, the censorship information field of the stored version of the media asset may be linked with the censorship information field of the newly available version of the media asset. The media guidance application may perform the same action (i.e., linking) between the other fields that share the same information type. The media guidance application may compare the data in the linked fields (e.g., linked censorship information fields) to determine which fields have matching data (e.g., censored for the stored version of the media asset compared with uncensored for the newly available version of the media asset).

Thus, for this field type there would be no match, and the media guidance application may store the field identifier for the field type. However, if both the originally stored version and the newly available version are both censored or both uncensored, the field identifier would not be stored.

In some embodiments, the media guidance application may maintain a record of all changes to default recording options the user makes when making a recording. The media guidance application may use the changes in order to determine user preferences for versions of media content. Specifically, the media guidance application may determine that a user has created a new scheduled recording for a media asset, and determine, for each recording option, of the new scheduled recording whether each recording option constitutes a change from a default recording option. The media guidance application may store, in a user's profile, for each recording option that constitutes the change from the default recording option, an indication that the change from the default recording option occurred.

For example, the media guidance application may be monitoring user input while a user is scheduling a recording of a media asset. The media guidance application may determine that the user changed a default recording option from "uncensored" to "censored." The media guidance application may store an indication of that change in the user's profile. In another example, the media guidance application may determine that the user changed the default recording option of "high definition" to "standard definition." In response, the media guidance application may store the indication of the change in the user's profile.

In some embodiments, the media guidance application may determine that the user has changed a recording option to a value that is different from what the user usually selects. In response, the media guidance application may determine whether there is a hardware resource restriction that is causing the user to select the different option. Specifically, the media guidance application may determine that a first recording option that constitutes a change is different from a recording option of a same type that is stored in the user's profile. In response to determining that the first recording option that constitutes the change is different from the recording option of the same type that is stored in the user's profile, the media guidance application may take the following actions. The media guidance application may retrieve a hardware resource associated with the first recording option, and determine whether the hardware resource is associated with a temporary restriction preventing the user from selecting the recording option of the same type that the user usually selects.

For example, the media guidance application may determine that a user selected a "standard definition" recording option, but the user's profile indicates "high definition" as the user's usual choice of a recording option. In response, the media guidance application may identify all resources associated with a recording (e.g., storage space) and determine whether there is a resource restriction (e.g., not enough storage space for a high definition version to be recorded). The media guidance application may in response to the determination not update the user's profile indicating a change from "high definition" to "standing definition."

In some embodiments, the media guidance application may inform the user that the user has selected a recording option that is different from what is stored in the user's profile (e.g., a user's preferred option) and in response, enable a user to select a reason for the selection. Specifically, the media guidance application may determine that the first recording option that constitutes the change is different from a recording option that is stored in the user's profile, where the first recording option and the recording option that is stored in the user's profile are both of a first type. In response to determining that the first recording option that constitutes the change is different from the recording option that is stored in the user's profile, the media guidance application may generate for display (1) an indication of the first recording option, (2) an indication of the recording option that is stored in the user's profile, and (3) a plurality of user-selectable options, wherein each user-selectable option indicates a reason for the change. In response to a user selection of a user selection option of the plurality of user-selectable options, the media guidance application may update the user's profile with the user-selectable option.

For example, the media guidance application may determine that the user has selected to record a "censored" version of the media asset. The media guidance application may determine, based on the user's profile, that the user usually records uncensored versions of media assets and in response, generate for display for the user a number of options for the user's different selection. For example, the media guidance application may generate an option indicating that underage persons are expected to consume the media asset and that this selection is temporary. Another option may indicate that this is a permanent change in the user's preference. In response to the user selecting the option indicating a permanent change in preference, the media guidance application may update the user's profile.

In some embodiments, the media guidance application may determine a user's preference for a particular type of a recording option. Specifically, the media guidance application may select a first type of recording option, and determine, for the first type of recording option, that the user's profile includes a plurality of indications each indicating that a change from the default recording option occurred. The media guidance application may determine, based on the plurality of indications, a number of changes for each recording option of the first type of recording option, and set the user's preference for the type of recording option to a recording option with a highest number of changes. For example, the media guidance application may determine that the user has changed a default recording option from "uncensored" to "censored" nine times and "censored" to "uncensored" one time. The media guidance application may determine that the user's preference is for censored content and set the censorship option type in the user's profile to "censored."

In some embodiments, the media guidance application may determine which characteristic would be preferred by the user when both the stored version's characteristic and the corresponding newly available version's corresponding characteristic does not match the user's preferred characteristic for the characteristic type. The media guidance application may, when comparing the first set of characteristics with the user preferences for versions of media assets and the second set of characteristics with the user preferences for versions of media assets, take the following actions. The media guidance application may determine that a first characteristic of a first type in the first set of characteristics does not match the user preferences for the first type of characteristic, and determine that a second characteristic of the first type in the second set of characteristics does not match the user preferences for the first type of characteristic. The media guidance application may retrieve an ordered list associated with the first type of characteristics, and determine, based on the ordered list, whether the user's preference for the first type of characteristic is closer to the first characteristic or to the second characteristic. In response to determining that the user's preference for the first type of characteristic is closer to the first characteristic than to the second characteristic, the media guidance application may increase a preference score associated with the first version of the media asset.

For example, the media guidance application may determine that a stored version of the media asset is a "standard definition" version and a newly available version is a "high definition" version. However, the media guidance application may determine that the user prefers a 4K version of the media asset, which has a higher definition than "high definition." The media guidance application may determine, based on a retrieved list of possible characteristics for this specific type that "high definition" is closer than "standard definition" to the user's preference and determine that in regard to this particular characteristic the newly available media asset should be chosen to replace the stored media asset.

In some embodiments, the media guidance application may indicate to the user, while the user is consuming media, that a recorded version of media content will be replaced by a newly available version. The media guidance application may also present, to the user, characteristics of each version. Specifically, the media guidance application may determine that a user is consuming media. In response to determining both that (1) the user is consuming media and (2) that the second version of the media asset is available, the media guidance application may generate for display an indication that the second version is available, where the indication includes a summary of characteristics that are different between the first version and the second version.

For example, the media guidance application may have determined that a stored version of a media asset and a newly available version differ in that the stored version is a "standard definition" version that is "censored" and the newly available version is a "high definition" version that is "uncensored." The media guidance application may generate for display on a device from which the user is consuming media the differences and inform the user that the stored version will be replaced with the newly available version. In some embodiments, the media guidance application may generate for display, together with the indication, or separately, the user's preference for media content. In particular, the media guidance application may generate for display the user's preferences for the characteristics of the two versions that differ from each other.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 1A, 1B, and 1C show an illustrative example of data structure that includes characteristics corresponding to a first version of the media asset (FIG. 1A), a second version of the media asset (FIG. 1B), and data structure corresponding to the user's preferred characteristics (FIG. 1C), in accordance with some embodiments of the disclosure;

FIG. 7 is another flowchart of illustrative actions for replacing a stored version of media based on user preferences, in accordance with some embodiments of the disclosure;

DETAILED DESCRIPTION

Figure 2:
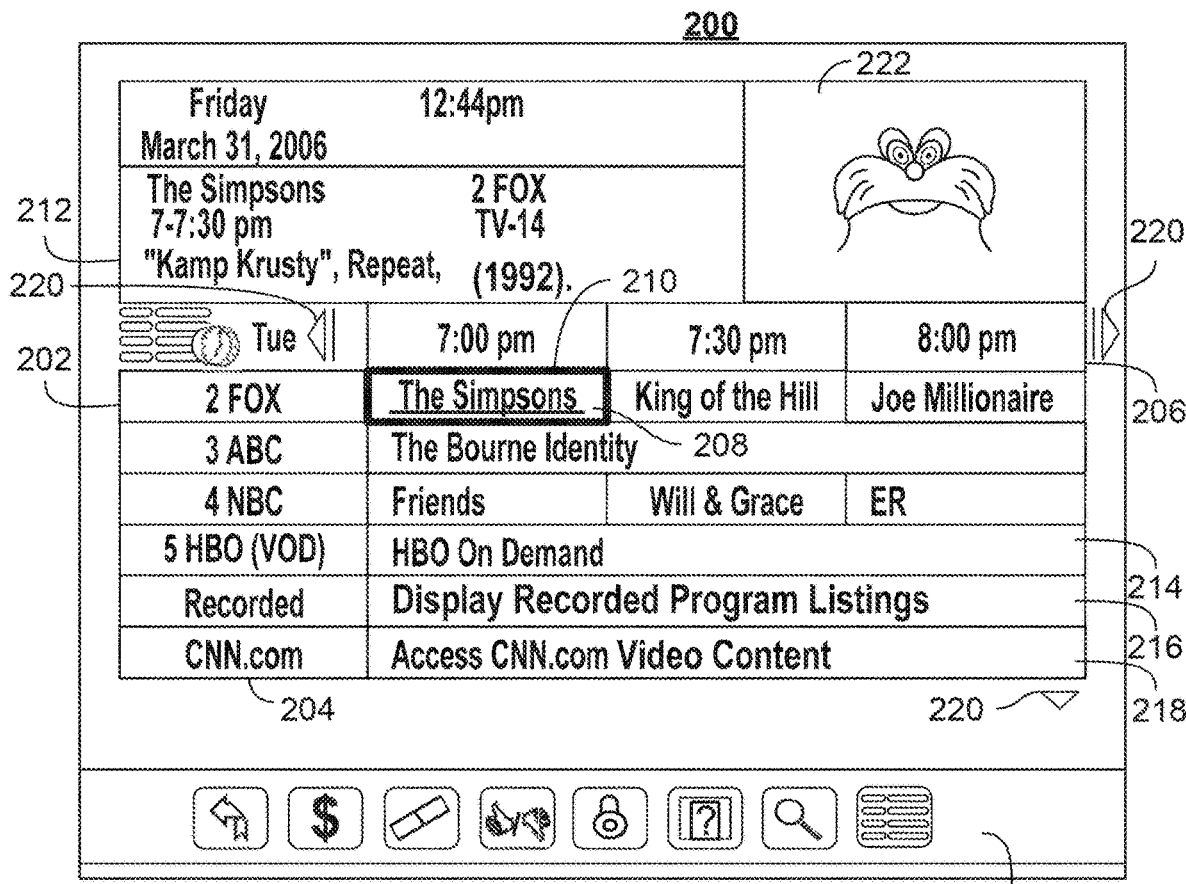
FIG. 2 shows an illustrative example of a display screen for use in accessing media content in accordance with some embodiments of the disclosure.

Systems and methods are disclosed herein for replacing a stored version of media based on user preferences. A first version of a media asset may be stored (e.g., recorded). Availability of a second version of the media asset may be determined. A first set of characteristics of the first version of the media asset and a second set of characteristics of the second version of the media asset may be identified, where the first set of characteristics and the second set of characteristics include corresponding characteristics that are different between the first version of the media asset and the second version of the media asset. A determination may be made that the second set of characteristics is preferred by the user over the first set of characteristics, and in response, the first version of the media asset may be replaced with the second version of the media asset.

In some embodiments, the media guidance application may store a first version of a media asset. For example, the media guidance application may store a recording of a media asset. The media guidance application may generate a data structure (e.g., data structure 100, FIG. 1A) to store metadata associated with the version of the media asset. Data structure 100 may include a plurality of fields (e.g., fields 102, FIG. 1B) that describe a type of characteristic and another plurality of fields (e.g., fields 104, FIG. 1A) that include values for the characteristic types (e.g., of fields 102). The media guidance application may extract the proper metadata from another source and insert that metadata into the data structure.

The media guidance application may determine that a second version of the media asset is available. For example, the media guidance application may receive new program guide data and, based on the program guide data, determine that the media asset (e.g., a particular television program) is going to be broadcast again. Specifically, the media guidance application may store an identifier associated with the media asset, and the new program guide data may include identifiers of programs. The media guidance application may compare the program identifiers associated with the new program guide data with an identifier of the media asset to determine that a new version is available.

The media guidance application may extract version characteristics for each version of the program (i.e., the originally recorded version and the newly available version). Specifically, the media guidance application may extract a first plurality of characteristics associated with the first version of the media asset, and a second plurality of characteristics associated with the second version of the media asset. For example, the media guidance application may parse metadata associated with the first media asset. The metadata may be stored as part of recording the media asset. In some embodiments, the metadata may be extracted from the program listing associated with the originally stored version of the media asset. The media guidance application may retrieve a characteristic together with a characteristic type and store the information in a data structure. The media guidance application may perform similar actions for the newly available version of the media asset. For example, the media guidance application may parse the metadata in the program listing associated with the media asset. Alternatively or additionally, the media guidance application may (for both the originally stored version and the newly available version of the media asset) access a remote database and retrieve the characteristics of each version from the database.

The media guidance application may store the extracted data associated with the stored version of the media asset in one data structure and the extracted data associated with the newly available media asset in another data structure. For example, the extracted data for the first version of the media asset (i.e., the stored version) may be stored in data structure 100 with characteristic type fields (e.g., fields 102) and characteristic value fields (e.g., fields 104). The extracted data for the second version of the media asset (i.e., the newly available version) may be stored in data structure 120 (FIG. 1B) with characteristic type fields (e.g., fields 122, FIG. 1B)

and characteristic value fields (e.g., fields 124, FIG. 1B). Characteristic types may include censorship type, resolution type, advertisement inclusion type, and other suitable types. The values may include "censored" or "uncensored" for censorship type. It should be noted that other values may be included for censorship type. For example, types may include a type where violence and/or sexual content are edited out while other content is not censored. Resolution type may include values of "standard definition," "high definition," "3-D," and other suitable values.

The media guidance application may compare the corresponding characteristics to find the differences between the stored version and the newly available version. Specifically, the media guidance application may compare each characteristic in the second plurality of characteristics with a corresponding characteristic in the first plurality of characteristics. For example, the media guidance application may iterate through each characteristic type stored in a data structure 100 and compare the characteristic type with characteristic types of data structure 120. Specifically, the media guidance application may compare the "Characteristic Type 2" field with each characteristic type file to find a match. The media guidance application may compare the values of the corresponding fields in order to determine whether the values match.

The media guidance application may generate sets of characteristics that do not match between the stored version and the newly available. Specifically the media guidance application may generate, based on the comparing, a first set of characteristics, where the first set of characteristics includes one or more characteristics in the first plurality that do not match one or more corresponding characteristics in the second plurality of characteristics. The media guidance application may generate, based on the comparing, a second set of characteristics, where the second set of characteristics includes one or more characteristics in the second plurality that do not match one or more corresponding characteristics in the first plurality of characteristics. For example, the media guidance application may compare each of the characteristic value fields 104 of data structure 100 with a corresponding characteristic value field 124 of data structure 120. In the example of data structures 100 and 120, characteristic type 1 will match, while the other fields will not. Thus, the first set of characteristics will include values B, C, and D, and the second set of characteristics will include values X, Y, and Z.

The media guidance application may compare both sets of characteristics with characteristics preferred by the user. Specifically, the media guidance application may compare the first set of characteristics with user preferences for versions of media assets and the second set of characteristics with the user preferences for versions of media assets. For example, data structure 150 (FIG. 1C) may represent a portion of the user's profile that stores user preferences for versions of media asset. Characteristic type fields 152 (FIG. 1C) may store the types of fields and characteristic value fields 154 (FIG. 1C) may store the values corresponding to the types. The media guidance application may compare each characteristic type value (e.g., values 104) of data structure 100 with a corresponding characteristic type value (e.g., corresponding value 154) of data structure 150. The media guidance application may also compare each characteristic type value (e.g., values 124) of data structure 120 with a corresponding characteristic type value (e.g., corresponding value 154) of data structure 150.

The media guidance application may determine which set of characteristics is preferred by the user. Specifically, the media guidance application may determine, based on comparing the first set of characteristics with the user preferences and the second set with the user preferences, that the user prefers versions of media assets that match the second set of characteristics. As exemplified in the data structures of FIGS. 1A, 1B, and 1C, the media guidance application may determine that the stored version (as at least partially illustrated in data structure 100) will match one characteristic type, while the newly available version will match two characteristic types. Thus, the newly available version will be a better suited version for the user.

The media guidance application may, in response to determining that the user prefers characteristics associated with the second version, replace the first version with the second version. Specifically, the media guidance application may, in response to determining that the user prefers the versions of media assets that match the second set of characteristics, replace the first version of the media asset with the second version of the media asset. For example, the media guidance application may record the second version and delete the first version of the media asset.

In some embodiments, the media guidance application may, when extracting the first plurality of characteristics associated with the first version of the media asset, and the second plurality of characteristics associated with the second version of the media asset, perform the following actions. The media guidance application may generate a first data structure for the first version of the media asset and a second data structure for the second version of the media asset, where the first data structure includes a first plurality of fields and the second data structure includes a second plurality of fields. The media guidance application may iterate through metadata associated with the first version of the media asset to insert the first plurality of characteristics associated with the first version of the media asset into corresponding fields of the first plurality of fields. The media guidance application may iterate through metadata associated with the second version of the media asset to insert the second plurality of characteristics associated with the second version of the media asset into corresponding fields of the second plurality of fields.

For example, the media guidance application may create a data structure for the stored version of the media asset (e.g., data structure 100) that includes a field for each type of characteristic. The media guidance application may create a similar or identical data structure for the newly available version of the media asset (e.g., data structure 120). The media guidance application may access the metadata associated with the stored version of the media asset and also the metadata associated with the newly available version of the media asset. It should be noted that in the examples discussed the first version of the media asset refers to the previously stored version of the media asset, and the second version of the media asset refers to a newly available version of the media asset. In some embodiments, the metadata for the first version of the media asset may be stored in a data structure (e.g., a database table) or a structured file (e.g., XML file). The media guidance application may iterate through the data structure or the data file and identify values associated with characteristic types. For example, if the metadata is stored in an XML file, the media guidance application may search for XML tags associated with specific characteristic types. The media guidance application may extract the information from the tag and place it into the proper characteristic value with a data structure associated with the first version of the media asset (e.g., data structure 100). The media guidance application may repeat the process for the second version of the media asset.

In some embodiments, the media guidance application may, when comparing each characteristic in the second plurality of characteristics with the corresponding characteristic in the first plurality of characteristics, perform the following actions. The media guidance application may select a first field in the first plurality of fields, and determine an information type associated with the first field. The media guidance application may compare the information type associated with the first field with an information type of each field in the second data structure, and identify, based on comparing the information type associated with the first field with the information type of each field in the second data structure, a second field in the second data structure, where the second field is of the information type associated with the first field. The media guidance application may compare data in the first field with the data in the second field.

For example, the media guidance application may select one of fields 124 and determine the corresponding characteristic type (e.g., one of characteristic types 122). The media guidance application may compare the characteristic type of the selected field 124 with each characteristic type in data structure 100. The media guidance application may compare the characteristic value fields of the selected field 124 with the corresponding field 104.

The media guidance application may, when generating the first set of characteristics, perform the following actions. The media guidance application may determine, for each field in the first plurality of fields a corresponding field in the second plurality of fields, and compare, for each field in the first plurality of fields, a field's data with a field's data associated with the corresponding field in the second plurality of fields. The media guidance application may determine, based on comparing, for each field in the first plurality of fields, the field's data with the field's data of the corresponding field in the second plurality of fields, whether each field's data in the first plurality of fields matches the corresponding field's data in the second plurality of fields. The media guidance application may store a field identifier for each field in the first plurality of fields where the field's data does not match the field's data of the corresponding field in the second plurality of fields.

For example, the media guidance application may select one of fields 124 and determine the corresponding characteristic type (e.g., one of characteristic types 122). The media guidance application may compare the characteristic type of the selected field 124 with each characteristic type in data structure 100. The media guidance application may compare the characteristic value fields of the selected field 124 with the corresponding field 104. The media guidance application may determine that Characteristic Type 1 field of data structure 100 matches the Characteristic Type 1 field of data structure 120. Therefore, the identifier of the field will not be stored by the media guidance application. However, the media guidance application may determine that Characteristic Type 2 field of data structure 100 does not match the Characteristic Type 2 field of data structure 120. Therefore, the identifier of the field will be stored by the media guidance application.

In some embodiments, the media guidance application may maintain a record of all changes to default recording options the user makes when making a recording. The media guidance application may use the changes in order to determine user preferences for a version of media content. Specifically, the media guidance application may determine that a user has created a new scheduled recording for a media asset, and determine, for each recording option of the new scheduled recording, whether each recording option constitutes a change from a default recording option. The media guidance application may store, in a user's profile, for each recording option that constitutes the change from the default recording option, an indication that the change from the default recording option occurred.

For example, the media guidance application may be monitoring user input while a user schedules a recording of a media asset. The media guidance application may determine, from the user input that the user changed a default recording option to another available option. The media guidance application may store an indication of that change in the user's profile. It should be noted that the user profile may be distributed and the update may be sent to a server so that the other device may access the information in the profile, including the newly added indication.

In some embodiments, the media guidance application may determine that the user has changed a recording option to a value that is different from what the user usually selects. In response, the media guidance application may determine whether there is a hardware resource restriction that is causing the user to select the different option. Specifically, the media guidance application may determine that a first recording option that constitutes a change is different from a recording option of a same type that is stored in the user's profile. In response to determining that the first recording option that constitutes the change is different from the recording option of the same type that is stored in the user's profile, the media guidance application may take the following actions. The media guidance application may retrieve a hardware resource associated with the first recording option, and determine whether the hardware resource is associated with a temporary restriction preventing the user from selecting the recording option of the same type that the user usually selects.

For example, the media guidance application may determine that a user selected a recording option associated with Characteristic Type 1. It should be noted that the media guidance application may maintain a table that stores for each recording option a corresponding characteristic type. Thus, the media guidance application may perform a look-up of a characteristic type associated with a selected recording type. The media guidance application may compare the characteristic type associated with the recording option with each characteristic type preferred by the user (e.g., characteristic types stored in data structure 150) to identify the characteristic type in the user's profile corresponding to the characteristic type associated with the recording option. The media guidance application may compare the characteristic values of the characteristic type associated with the recording option and the corresponding characteristic type stored in the user's profile (e.g., preferred by the user). If the values of the characteristic type associated with the recording option and the corresponding characteristic type stored in the user's profile do not match, the media guidance application may attempt to determine the reason. The media guidance application may retrieve one or more hardware resources associated with the recording option. It should be noted that the media guidance application may maintain a table of recording options and corresponding hardware resources. The media guidance application may perform a look-up of the proper hardware resources (e.g., hard disk space) and determine whether there is enough of each resource to satisfy the characteristic value stored in the user's profile. If there is not enough of at least one resource, the media guidance application may determine that the user is forced to make the change in the recording option and the user's preference did not change. However, if there is enough of each resource associated with the recording option, the media guidance application may determine that the change should be stored because it may indicate a change in the user's preference for that recording option.

In some embodiments, the media guidance application may inform the user that the user has selected a recording option that is different from what is stored in the user's profile (e.g., a user's preferred option) and in response, enable a user to select a reason for the selection. Specifically, the media guidance application may determine that the first recording option that constitutes the change is different from a recording option that is stored in the user's profile, where the first recording option and the recording option that is stored in the user's profile are both of a first type. In response to determining that the first recording option that constitutes the change is different from the recording option that is stored in the user's profile, the media guidance application may generate for display (1) an indication of the first recording option, (2) an indication of the recording option that is stored in the user's profile, and (3) a plurality of user-selectable options, wherein each user-selectable option indicates a reason for the change. In response to a user selection of a user selectable option of the plurality of user-selectable options, the media guidance application may update the user's profile with the user-selectable option.

For example, the media guidance application may compare the characteristic type associated with the recording option with each characteristic type preferred by the user (e.g., characteristic types stored in data structure 150) to identify the characteristic type in the user's profile corresponding to the characteristic type associated with the recording option. The media guidance application may compare the characteristic values of the characteristic type associated with the recording option and the corresponding characteristic type stored in the user's profile (e.g., preferred by the user). If the values of the characteristic type associated with the recording option and the corresponding characteristic type stored in the user's profile do not match, the media guidance application may generate for display a plurality of selectable indicators, each representing a reason that the user changed her or her preference. If the user makes a selection of one of the reasons, the media guidance application may store that selection. In some embodiments, the media guidance application may update the user's preferences based on the selected reason.

In some embodiments, the media guidance application may determine a user's preference for a particular type of a recording option. Specifically, the media guidance application may select a first type of recording option, and determine, for the first type of recording option, that the user's profile includes a plurality of indications, each indicating that a change from the default recording option occurred. The media guidance application may determine, based on the plurality of indications, a number of changes for each recording option of the first type of recording option, and set the user's preference for the type of recording option to a recording option with a highest number of changes. For example, the media guidance application may select a first type recording option and iterate through the user's profile for indications that the first recording option was changed to a particular value. The media guidance application may compile a list of values that the first recording option was changed to and determine how many values are the same. The media guidance application may determine the highest number of values and set that value as the user's preference.

In some embodiments, the media guidance application may determine which characteristic would be preferred by the user when both the stored version's characteristic and the corresponding newly available version's corresponding characteristic does not match the user's preferred characteristic for the characteristic type. The media guidance application may, when comparing the first set of characteristics with the user preferences for versions of media assets and the second set of characteristics with the user preferences for versions of media assets, take the following actions. The media guidance application may determine that a first characteristic of a first type in the first set of characteristics does not match the user preferences for the first type of characteristic, and determine that a second characteristic of the first type in the second set of characteristics does not match the user preferences for the first type of characteristic. The media guidance application may retrieve an ordered list associated with the first type of characteristics, and determine, based on the ordered list, whether the user's preference for the first type of characteristic is closer to the first characteristic or to the second characteristic. In response to determining that the user's preference for the first type of characteristic is closer to the first characteristic than to the second characteristic, the media guidance application may increase a preference score associated with the first version of the media asset.

As exemplified in FIG. 1, a stored version of the media asset (e.g., data structure 100, FIG. 1A) may include a characteristic type (e.g., Characteristic Type 4) that has a value (e.g., Value D) that does not match the user's preferred value for that type of characteristic (e.g., Characteristic Type 4 of data structure 150, FIG. 1C). Additionally, the newly available version of the media asset may have the same characteristic type (e.g., Characteristic Type 4 of data structure 120, FIG. 1B) that has a value (e.g., value Z) that does not match the user's preferred valued for that type of characteristic (e.g., Characteristic Type 4 of data structure 150, FIG. 1C). In this kind of embodiment, the media guidance application may determine which value is closer to the preferred value. The media guidance application may maintain a list (e.g., a table) of characteristic values for each characteristic type and a relationship between each value (i.e., how close each value is to another value). As an example, the media guidance application may maintain a score for each value and determine, based on how close the scores are, which characteristic is closer to another.

In some embodiments, the media guidance application may indicate to the user, while the user is consuming media, that a recorded version of media content will be replaced by a newly available version. The media guidance application may also present, to the user, characteristics of each version. Specifically, the media guidance application may determine that a user is consuming media. In response to determining both that (1) the user is consuming media and (2) that the second version of the media asset is available, generate for display an indication that the second version is available, where the indication includes a summary of characteristics that are different between the first version and the second version.

For example, the media guidance application may have determined that a stored version of a media asset and a newly available version differ in a way that the newly available version should replace the stored version. The media guidance application may generate for display on a device from which the user is consuming media the differences and inform the user that the stored version will be replaced with the newly available version. In some embodiments, the media guidance application may generate for display, together with the indication, or separately, the user's preference for media content. In particular, the media guidance application may generate for display the user's preferences for the characteristics of the two versions that differ from each other.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
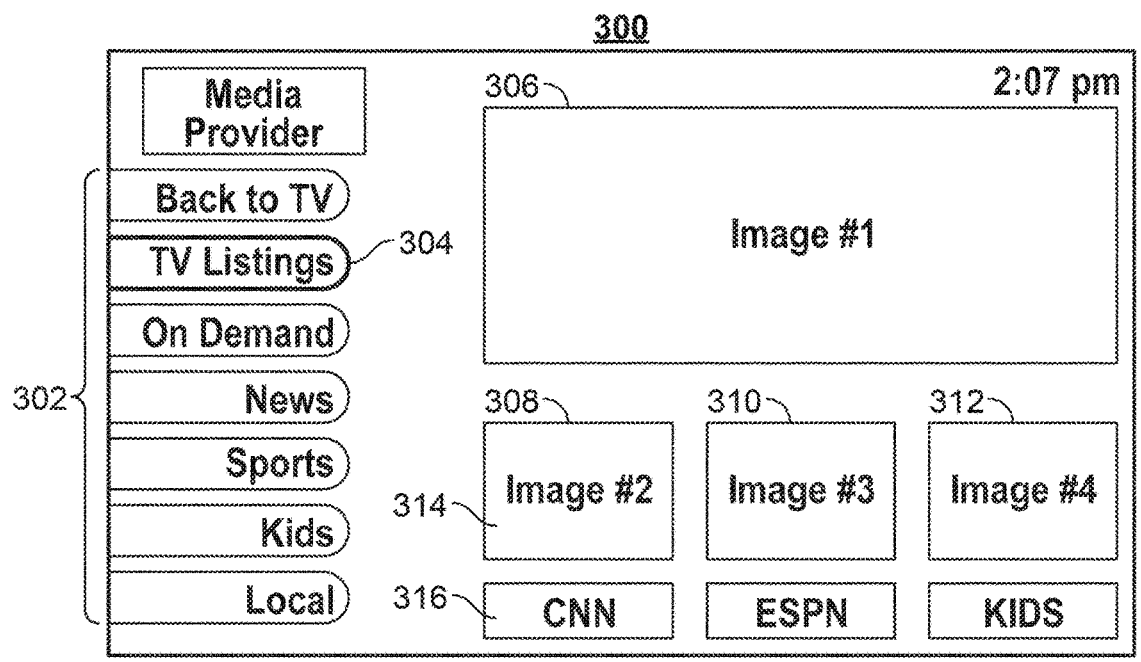
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
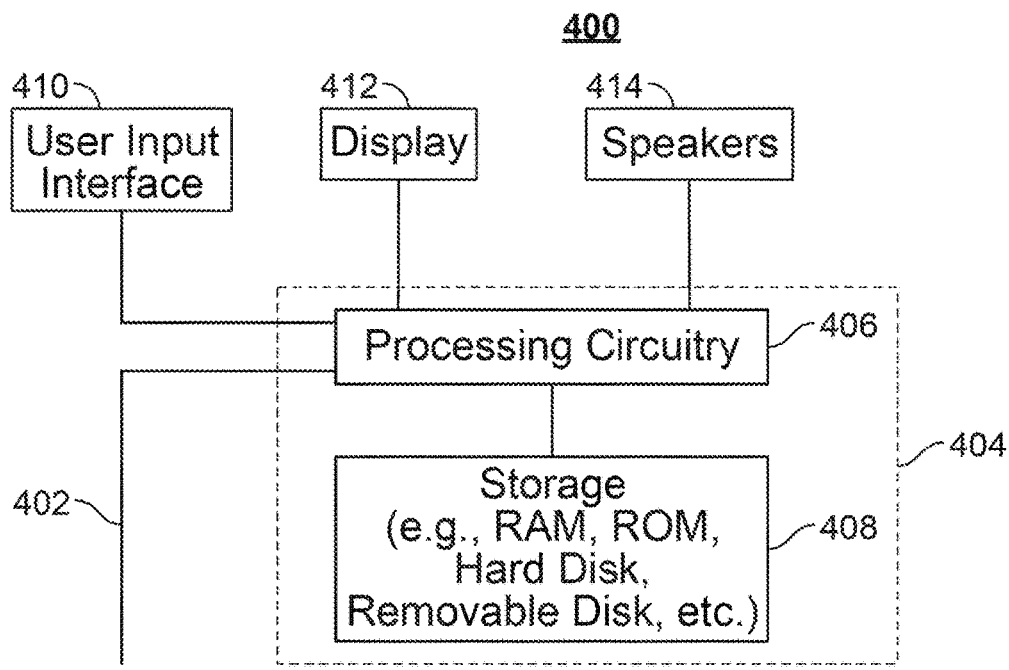
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
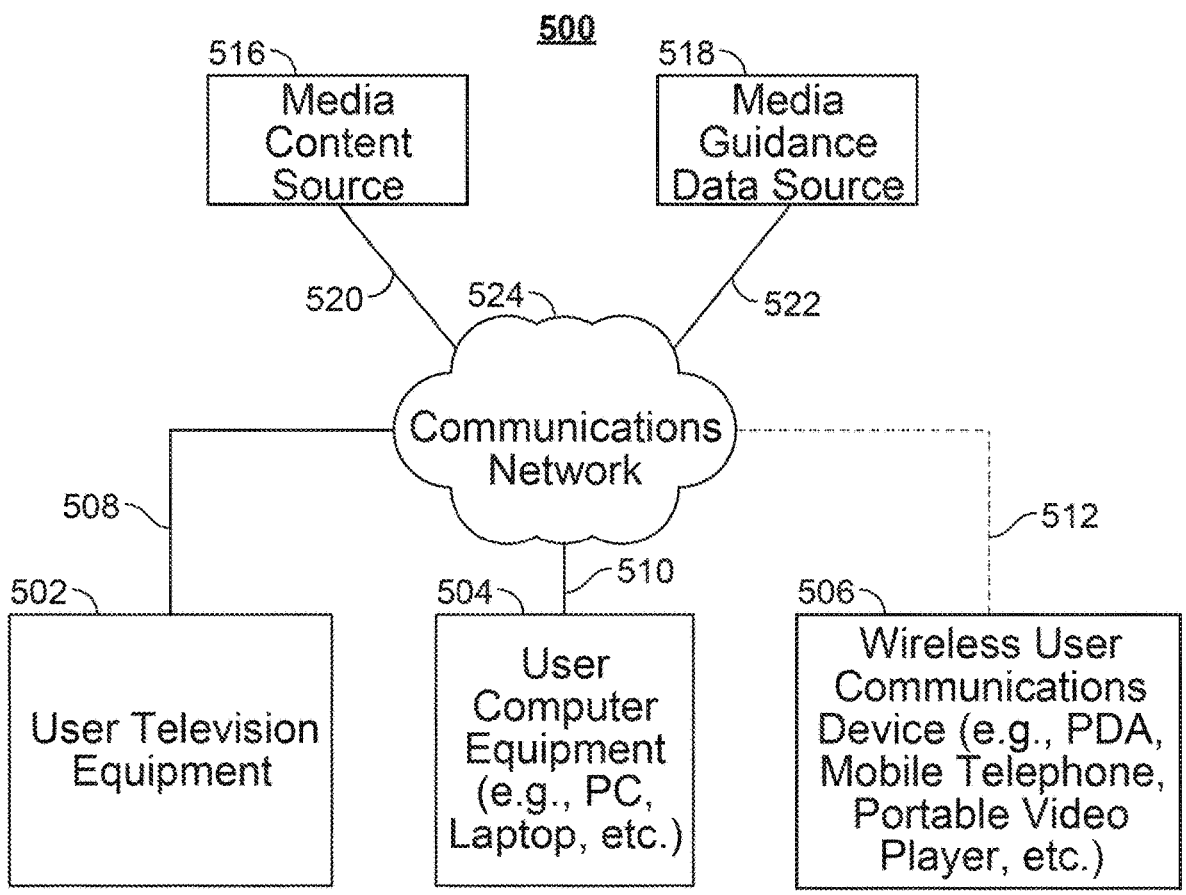
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively.

Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
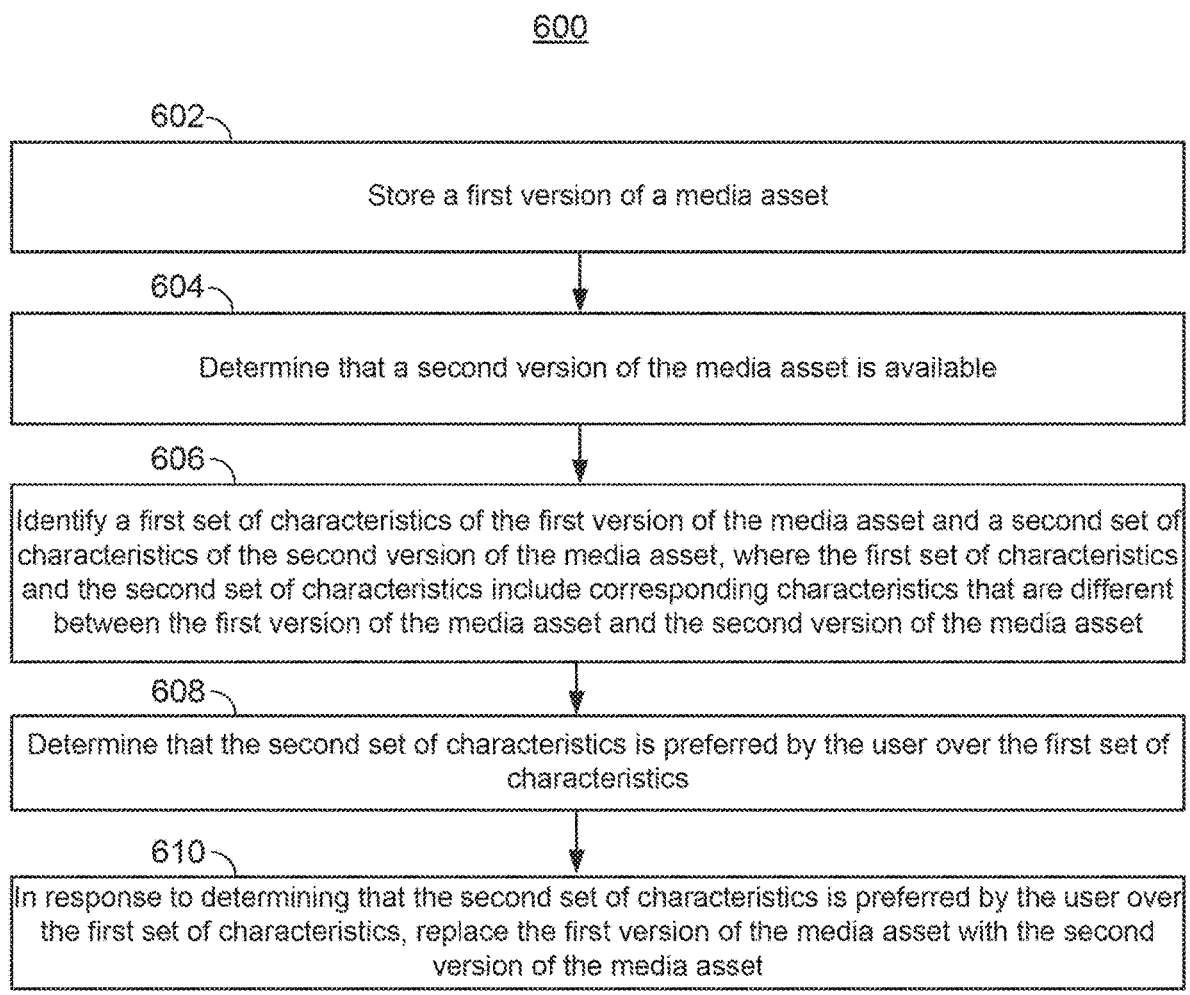
FIG. 6 is a flowchart of illustrative actions for replacing a stored version of media based on user preferences, in accordance with some embodiments of the disclosure.

FIG. 6 is a flowchart of illustrative actions for replacing a stored version of media based on user preferences, in accordance with some embodiments of the disclosure. At 602, control circuitry 404 stores a first version of a media asset. For example, the control circuitry may execute a scheduled recording of a media asset. The control circuitry may store the media asset at storage 408 or on a remote server (e.g., media content source 516 or media guidance data source 518).

At 604, control circuitry 404 determines that a second version of the media asset is available. For example, the control circuitry may receive (e.g., from media content source 516 and/or media guidance data source 518 through communications network 524) program listing information. The control circuitry may store the received program listing information in storage 408.

At 606, the control circuitry identifies a first set of characteristics of the first version of the media asset and a second set of characteristics of the second version of the media asset, where the first set of characteristics and the second set of characteristics include corresponding characteristics that are different between the first version of the media asset and the second version of the media asset. For example, the control circuitry may retrieve from a data structure associated with the first version of the media asset (e.g., data structure 100) a plurality of characteristics associated with the first version of the media asset. Data structure 100 may be stored in storage 408 or at a remote server (e.g., a server associated with media content source 516 or media guidance data source 518). The control circuitry may retrieve from a data structure associated with the second version of the media asset (e.g., data structure 120) a plurality of characteristics associated with the first version of the media asset. Data structure 120 may be stored in storage 408 or at a remote server (e.g., a server associated with media content source 516 or media guidance data source 518). The control circuitry may compare the corresponding characteristics to determine which do not match.

At 608, control circuitry 404 determines that the second set of characteristics is preferred by the user over the first set of characteristics. For example, the control circuitry may compare the first set of characteristics and the second set of characteristics with the user's preferred characteristics to make the determination. At 610, in response to determining that the second set of characteristics is preferred by the user over the first set of characteristics, control circuitry 404 replaces the first version of the media asset with the second version of the media asset. For example, the control circuitry may delete the first version from storage 408 and store the second version in storage 408. Additionally or alternatively, the control circuitry may perform the deletion operation and the storage operation on a remote server (e.g., a server associated with media content source 516 or media guidance data source 518).

FIG. 7 is another flowchart of illustrative actions for replacing a stored version of media based on user preferences, in accordance with some embodiments of the disclosure. At 702, control circuitry 404 stores a first version of a media asset. For example, the control circuitry may execute a scheduled recording of a media asset. The control circuitry may store the media asset at storage 408 or on a remote server (e.g., a server associated with media content source 516 or media guidance data source 518).

At 704, control circuitry 404 determines that a second version of the media asset is available. For example, the control circuitry may receive (e.g., from media content source 516 and/or media guidance data source 518 through communications network 524) program listing information. The control circuitry may store the received program listing information in storage 408.

At 706, control circuitry 404 extracts a first plurality of characteristics associated with the first version of the media asset, and a second plurality of characteristics associated with the second version of the media asset. For example, the control circuitry may access metadata associated with the first version of the media asset. The metadata may be accessed from storage 408 and/or from a remote server (e.g., a server associated with media content source 516 or media guidance data source 518). The control circuitry may use an application program interface to access the appropriate data. The control circuitry may perform the same or similar actions to extract the second plurality of characteristics.

At 708, control circuitry 404 compares each characteristic in the second plurality of characteristics with a corresponding characteristic in the first plurality of characteristics. The control circuitry may retrieve (e.g., from storage 408) each characteristic in the first plurality of characteristics and the second plurality of characteristics and perform a textual comparison of the characteristics.

At 710, control circuitry 404 generates, based on the comparing, a first set of characteristics, where the first set of characteristics includes one or more characteristics in the first plurality that do not match one or more corresponding characteristics in the second plurality of characteristics. For example, the control circuitry may generate a data structure for the first set of characteristics and store it in storage 408. Additionally or alternatively, the control circuitry may store the data structure at a remote server (e.g., a server associated with media content source 516 or media guidance data source 518).

At 712, control circuitry 404 generates, based on the comparing, a second set of characteristics, where the second set of characteristics includes one or more characteristics in the second plurality that do not match one or more corresponding characteristics in the first plurality of characteristics. For example, the control circuitry may generate a data structure for the second set of characteristics and store it in storage 408. Additionally or alternatively, the control circuitry may store the data structure at a remote server (e.g., a server associated with media content source 516 or media guidance data source 518).

At 714, control circuitry 404 compares the first set of characteristics with user preferences for versions of media assets and the second set of characteristics with the user preferences for versions of media assets. For example, the control circuitry may retrieve the first and second sets from storage 408. In some embodiments, the control circuitry may retrieve the first and second sets from a remote server (e.g., a server associated with media content source 516 or media guidance data source 518). The control circuitry may iterate through both sets of characteristics and compare the characteristics with the user preferences. The control circuitry may retrieve the user's preferences from the user's profile that may be stored in storage 408 and/or a remote server (e.g., a server associated with media content source 516 and/or media guidance data source 518).

At 716, control circuitry 404 determines, based on comparing the first set of characteristics with the user preferences and the second set with the user preferences, that the user prefers versions of media assets that match the second set of characteristics. The control circuitry may generate a data structure that stores a number of characteristics that match the user preferences of the first version and the second version. The data structure may be stored in storage 408 or at a remote server (e.g., a server associated with media content source 516 and/or media guidance data source 518).

At 718, control circuitry 404, in response to determining that the user prefers the versions of media assets that match the second set of characteristics, may replace the first version of the media asset with the second version of the media asset. For example, the control circuitry may determine that the first version of the media asset is stored in storage 408. In response, the control circuitry may delete the first version and store (e.g., record) the second version of the media asset in storage 408. In some embodiments, the control circuitry may determine that the first version of the media asset is stored at a remote server in a storage space allocated for the user. The control circuitry may instruct the remote server to delete the stored version and cause the second version to be stored in its place.

Figure 8:
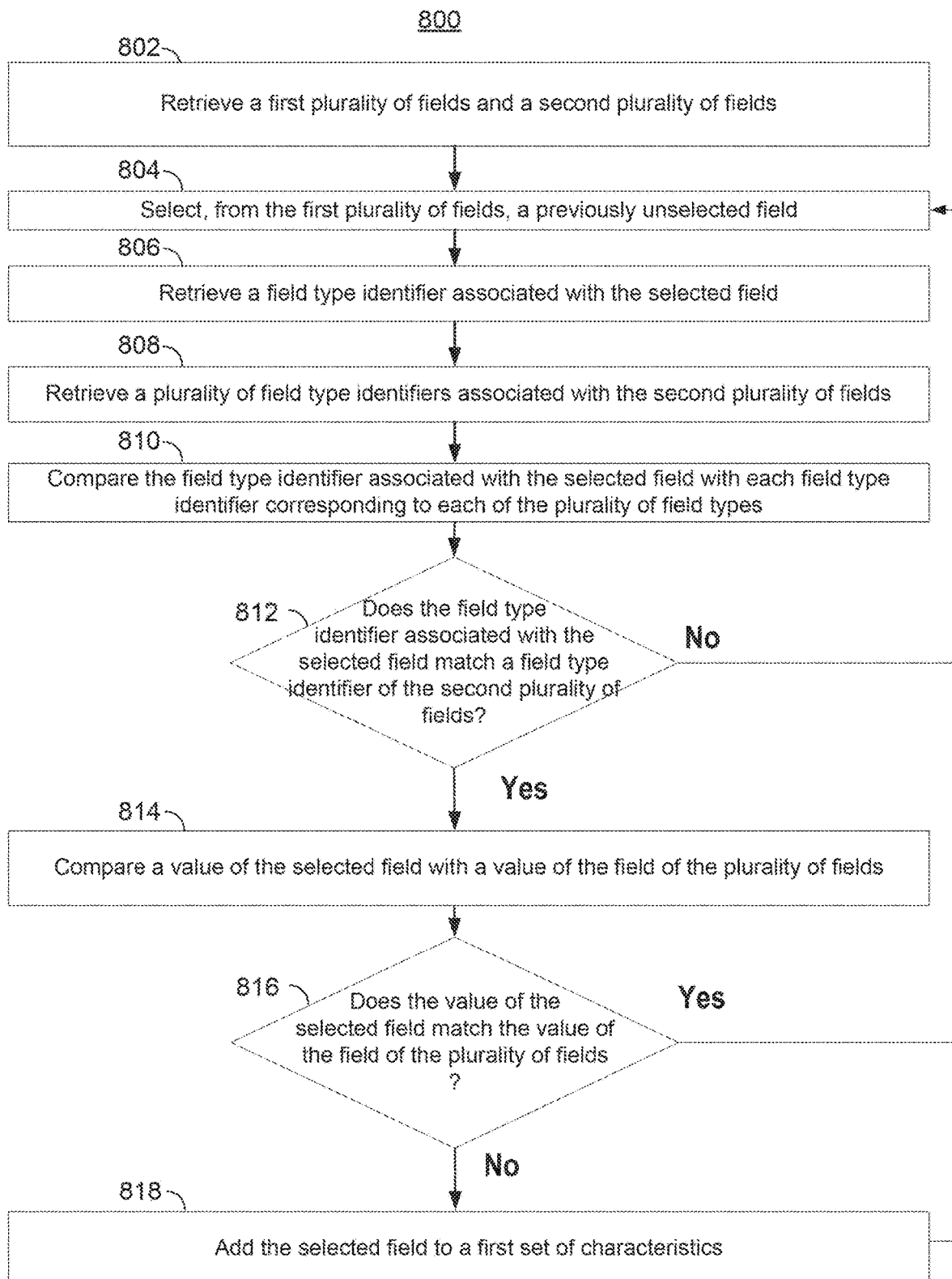
FIG. 8 is a flowchart of illustrative actions for generating a set of characteristics, in accordance with some embodiments of the disclosure.

FIG. 8 is a flowchart of illustrative actions for generating a set of characteristics, in accordance with some embodiments of the disclosure. At 802, control circuitry 404 retrieves a first plurality of fields and a second plurality of fields. For example, the control circuitry may retrieve the first and second pluralities of fields from storage 408. In some embodiments, the control circuitry may retrieve the first and second pluralities of fields from a remote server (e.g., a server associated with media content source 516 and/or media guidance data source 518). The fields may be in a form of two data structures one for each plurality.

At 804, control circuitry 404 selects, from the first plurality of fields, a previously unselected field. For example, the control circuitry may start iterating through each field in the data structure that stores the first plurality of fields by selecting the first field. At 806, control circuitry 404 retrieves a field type identifier associated with the selected field. The data structure may store a field type identifier for each plurality of fields. In some embodiments, FIGS. 1A, 1B, and 1C may be used as an example where fields 102 (FIG. 1A) may correspond to field type identifiers for each field. Thus, the control circuitry may retrieve a field type identifier of the selected field. The control circuitry may retrieve the field type identifier from a data structure stored in storage 408. In some embodiments, the control circuitry may perform the retrieval operation from a remote server (e.g., a server associated with media content source 516 and/or media guidance data source 518).

At 808, control circuitry 404 retrieves a plurality of field type identifiers associated with the second plurality of fields. In some embodiments, FIGS. 1A, 1B, and 1C may be used as an example where fields 122 (FIG. 1B) may correspond to field type identifiers for the second plurality of fields. Thus, the control circuitry may retrieve field type identifiers for fields 122 (FIG. 1B). The control circuitry may retrieve the plurality of field type identifier from a data structure stored in storage 408. In some embodiments, the control circuitry may perform the retrieval operation from a remote server (e.g., a server associated with media content source 516 and/or media guidance data source 518).

At 810, control circuitry 404 compares the field type identifier associated with the selected field with each field type identifier corresponding to each of the plurality of field types. For example, the control circuitry may iterate through each filed type identifier to identify one that matches the field type identifier associated with the selected field. At 812, control circuitry 404 determines, based on the comparison, whether the field type identifier associated with the selected field matches a field type identifier of the second plurality of fields. If the field type identifier associated with the selected field does not match a field type identifier of the second plurality of fields, process 800 moves to action 804. If the field type identifier associated with the selected field matches a field type identifier of the second plurality of fields, process 800 moves to action 814.

At 814, control circuitry 404 compares a value of the selected field with a value of the field of the plurality of fields. FIGS. 1A, 1B, and 1C may be used to illustrate the comparison where Characteristic Type 1 value field 104 (FIG. 1A) (e.g., Value A) is compared with Characteristic Type 1 value field 124 (FIG. 1B) (e.g., Value A). As another example, the control circuitry may compare Characteristic Type 2 value field 104 (FIG. 1A) (e.g., Value B) with Characteristic Type 2 value field 124 (FIG. 1B) (e.g., Value X). At 816, control circuitry 404 determines whether the value of the selected field matches the value of the field of the plurality of fields. If the value of the selected field matches the value of the field of the plurality of fields, process 800 moves to action 804. If the value of the selected field does not match the value of the field of the plurality of fields, process 800 moves to action 818.

At 818, control circuitry 404 adds the selected field to a first set of characteristics. For example, the control circuitry may be maintaining a data structure (e.g., in storage 408) of all characteristic types that do not match and add the characteristics as they are processed.

Figure 9:
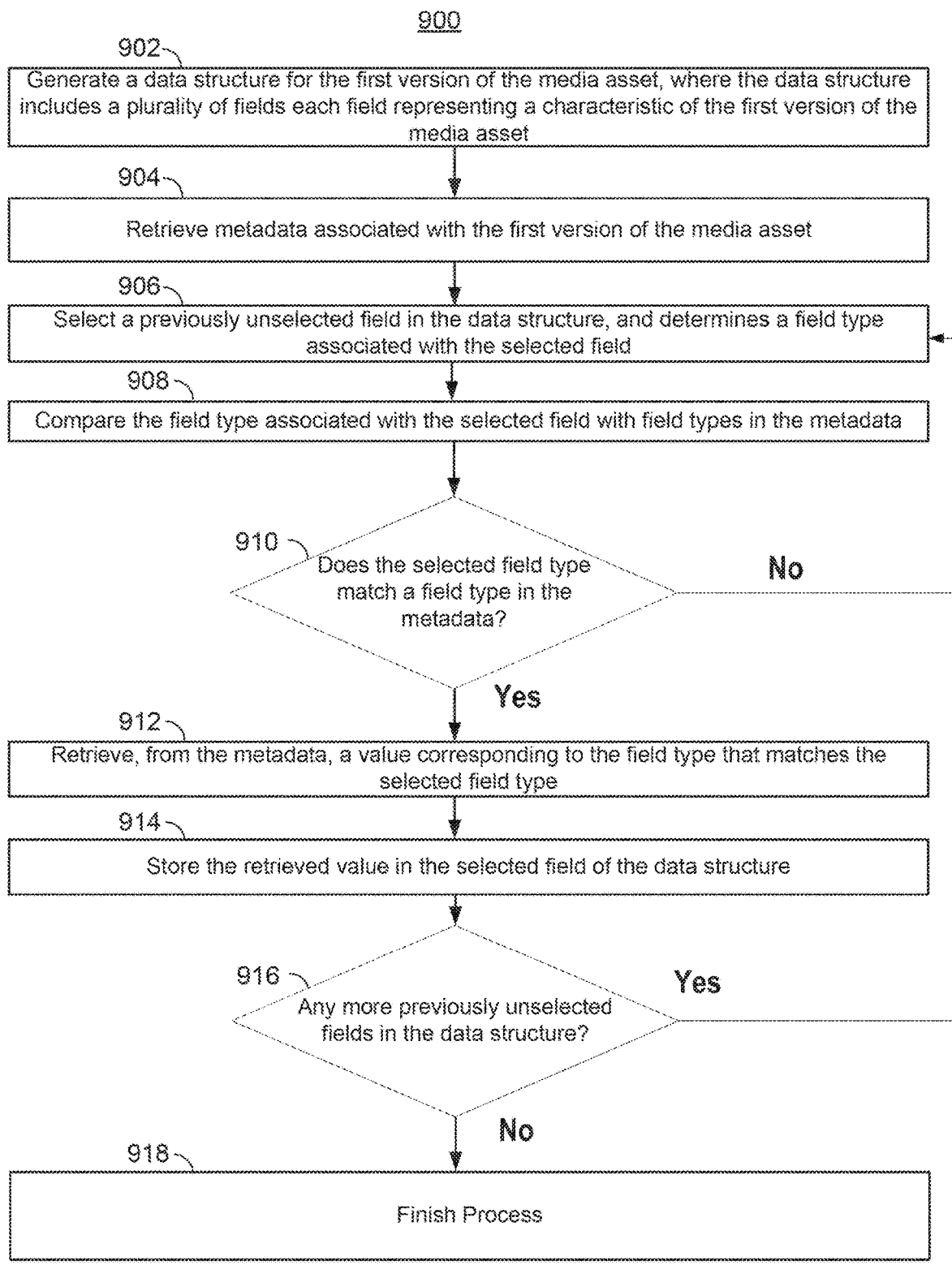
FIG. 9 is a flowchart of illustrative actions for extracting a plurality of characteristics from metadata associated with a version of a media asset, in accordance with some embodiments of the disclosure.

FIG. 9 is a flowchart of illustrative actions for extracting a plurality of characteristics from metadata associated with a version of a media asset, in accordance with some embodiments of the disclosure. At 902, control circuitry 404 generates a data structure for the first version of the media asset, where the data structure includes a plurality of fields each field representing a characteristic of the first version of the media asset. For example, the control circuitry may generate the data structure and store the data structure in storage 408. Additionally or alternatively, the control circuitry may store the data structure at a remote server (e.g., a server associated with media content source 516 and/or media guidance data source 518).

At 904, control circuitry 404 retrieves metadata associated with the first version of the media asset. For example, the control circuitry may perform the retrieval operation from storage 408. Additionally or alternatively, the control circuitry may perform the retrieval operation from a remote server (e.g., a server associated with media content source 516 and/or media guidance data source 518). At 906, control circuitry 404 selects a previously unselected field in the data structure, and determines a field type associated with the selected field. For example, the control circuitry may start iterating through each field of the data structure. It should be noted that the data structure may be created from a previously generated template. The template may be created by a user or generated automatically based on all known characteristics.

At 908, control circuitry 404 compares the field type associated with the selected field with field types in the metadata. For example, each field type may have an identifier (e.g., a string) or a descriptor. In addition, the metadata may be stored as a digital file that may be interpreted (e.g., an XML file). In some embodiments, the metadata may be stored as a database file that may be accessed through an Application Programming Interface ("API"). The control circuitry may use the API to access the metadata and search for match with the identifier or description of the selected field. If the file is in an XML format or a similarly interpreted file, the control circuitry may search for tags that match the identifier or descriptor. At 910, control circuitry 404 determines whether the selected field type matches a filed type in the metadata. If the selected field type does not match a filed type in the metadata, process 900 moves to action 906 where another previously unselected field is selected. It should be noted that if the match is not found, the characteristic does not exist in the metadata and thus, the field may be removed from the data structure to be more space efficient.

If the selected field type matches a filed type in the metadata, process 900 moves to action 912. At 912, control circuitry 404 retrieves, from the metadata, a value corresponding to the field type that matches the selected field type. For example, the control circuitry may generate a proper database request for the value (e.g., a database query) if the metadata is stored in the database. If the metadata is stored in an interpreted file (e.g., XML file), the control circuitry may retrieve the value from the file (e.g., data between proper start tag and end tag). At 916, control circuitry 404 determines whether there are any more previously unselected fields in the data structure. If the control circuitry determines that there are more previously unselected fields in the data structure, process 900 moves to action 906. If the control circuitry determines that there are no more previously unselected fields in the data structure, process 900 moves to action 918 where it ends.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a user selected scheduled recording option for a media asset;
   accessing a first plurality of characteristics associated with a first version of the media asset;
   accessing a second plurality of characteristics associated with a second version of the media asset;
   comparing the user selected scheduled recording option with the first plurality of characteristics and the second plurality of characteristics to determine a match;
   causing to store the first version of the media asset or the second version of the media asset for storage based on the determined match;
   comparing the user selected scheduled recording option with a default recording option; and
   based on determining that the user selected scheduled recording option is different from the default recording option based on the comparing the user selected scheduled recording option with the default recording option:
      providing for display a user selectable option to update the default recording option; and
      based on a user selection of the user selectable option, updating the default recording option with the user selected scheduled recording option.

2. The method of claim 1, further comprising:
   providing for display an indication of the updated default recording option.

3. The method of claim 1, further comprising:
   providing a first data structure of the first version of the media asset, wherein the first data structure comprises a first plurality of fields; and
   iterating through metadata associated with the first version of the media asset to insert the first plurality of characteristics associated with the first version of the media asset into corresponding fields of the first plurality of fields.

4. The method of claim 1, further comprising:
   providing a second data structure of the second version of the media asset, wherein the second data structure comprises a second plurality of fields; and
   iterating through metadata associated with the second version of the media asset to insert the second plurality of characteristics associated with the second version of the media asset into corresponding fields of the second plurality of fields.

5. The method of claim 1, further comprising:
   comparing each characteristic in the second plurality of characteristics with a corresponding characteristic in the first plurality of characteristics;
   providing, based on the comparing, a first set of characteristics, wherein the first set of characteristics includes one or more characteristics in the first plurality of characteristics that do not match one or more corresponding characteristics in the second plurality of characteristics; and
   providing, based on the comparing, a second set of characteristics, wherein the second set of characteristics includes one or more characteristics in the second plurality of characteristics that do not match one or more corresponding characteristics in the first plurality of characteristics.

6. The method of claim 5, further comprising:
   comparing the first set of characteristics with user preferences for versions of media assets and the second set of characteristics with the user preferences for versions of media assets;
   determining, based on comparing the first set of characteristics with the user preferences and the second set of characteristics with the user preferences, that the user prefers versions of media assets that match the second set of characteristics; and
   in response to determining that the user prefers the versions of media assets that match the second set of characteristics, replacing the first version of the media asset with the second version of the media asset.

7. The method of claim 1, wherein the first plurality of characteristics includes at least one of a censorship type, a resolution type, an advertisement inclusion type, or a content type, and wherein the second plurality of characteristics includes the at least one of the censorship type, the resolution type, the advertisement inclusion type, or the content type.

8. The method of claim 1, comprising:
   based on the determining that the user selected scheduled recording option is different from the default recording option:
      storing an indication that the scheduled recording option is different from the default recording option;
      retrieving information about a hardware resource associated with the scheduled recording option; and determining that the retrieved information about the hardware resource is associated with a temporary restriction preventing a user from selecting the default recording option.

9. A system comprising:
circuitry configured to:
receive a user selected scheduled recording option for a media asset;
access a first plurality of characteristics associated with a first version of the media asset;
access a second plurality of characteristics associated with a second version of the media asset;
compare the user selected scheduled recording option with the first plurality of characteristics and the second plurality of characteristics to determine a match;
cause to store the first version of the media asset or the second version of the media asset for storage based on the determined match;
compare the user selected scheduled recording option with a default recording option; and
based on determining that the user selected scheduled recording option is different from the default recording option based on the comparing the user selected scheduled recording option with the default recording option:
provide for display a user selectable option to update the default recording option; and
based on a user selection of the user selectable option, update the default recording option with the user selected scheduled recording option.

10. The system of claim 9, wherein the circuitry is further configured to:
provide for display an indication of the updated default recording option.

11. The system of claim 9, wherein the circuitry is further configured to:
provide a first data structure of the first version of the media asset, wherein the first data structure comprises a first plurality of fields; and
iterate through metadata associated with the first version of the media asset to insert the first plurality of characteristics associated with the first version of the media asset into corresponding fields of the first plurality of fields.

12. The system of claim 9, wherein the circuitry is further configured to:
provide a second data structure of the second version of the media asset, wherein the second data structure comprises a second plurality of fields; and
iterate through metadata associated with the second version of the media asset to insert the second plurality of characteristics associated with the second version of the media asset into corresponding fields of the second plurality of fields.

13. The system of claim 9, wherein the circuitry is further configured to:
compare each characteristic in the second plurality of characteristics with a corresponding characteristic in the first plurality of characteristics;
provide, based on the comparing, a first set of characteristics, wherein the first set of characteristics includes one or more characteristics in the first plurality of characteristics that do not match one or more corresponding characteristics in the second plurality of characteristics; and
provide, based on the comparing, a second set of characteristics, wherein the second set of characteristics includes one or more characteristics in the second plurality of characteristics that do not match one or more corresponding characteristics in the first plurality of characteristics.

14. The system of claim 13, wherein the circuitry is further configured to:
compare the first set of characteristics with user preferences for versions of media assets and the second set of characteristics with the user preferences for versions of media assets;
determine, based on comparing the first set of characteristics with the user preferences and the second set of characteristics with the user preferences, that the user prefers versions of media assets that match the second set of characteristics; and
in response to determining that the user prefers the versions of media assets that match the second set of characteristics, replace the first version of the media asset with the second version of the media asset.

15. The system of claim 9, wherein the first plurality of characteristics includes at least one of a censorship type, a resolution type, an advertisement inclusion type, or a content type, and wherein the second plurality of characteristics includes the at least one of the censorship type, the resolution type, the advertisement inclusion type, or the content type.

16. The system of claim 9, wherein the circuitry is further configured to:
based on the determining that the user selected scheduled recording option is different from the default recording option:
store an indication that the scheduled recording option is different from the default recording option;
retrieve information about a hardware resource associated with the scheduled recording option; and
determine that the retrieved information about the hardware resource is associated with a temporary restriction preventing a user from selecting the default recording option.

* * * * *